United States Patent Office 3,776,946
Patented Dec. 4, 1973

3,776,946
CHLORPHENESIN DERIVATIVES
Yuichi Inai and Kanzo Okazaki, Tokyo, Katsutoshi Shimada, Niizamachi, and Kengo Kagei and Motoaki Bessho, Tokyo, Japan, assignors to Eisai Co., Ltd., Tokyo, Japan
No Drawing. Filed Aug. 28, 1972, Ser. No. 284,358
Claims priority, application Japan, Sept. 3, 1971, 46/67,495
Int. Cl. C07c 101/00
U.S. Cl. 260—482 R                 3 Claims

ABSTRACT OF THE DISCLOSURE

Novel chlorophenesin derivatives having the formula of

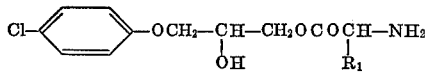

wherein $R_1$ is a hydrogen atom or a methyl group, and inorganic acid addition salts thereof are prepared by condensing chlorphenesin having the formula of

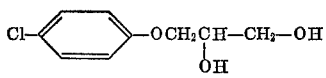

with a compound having the formula of

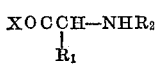

wherein $R_1$ is as defined above, X is a hydroxyl group or a halogen atom, and $R_2$ stands for an amino-protective group, and then splitting off the amino-protective group.

BACKGROUND OF THE INVENTION

Field of the invention

This invention relates to novel chlorphenesin derivatives expressed by the following General Formula I:

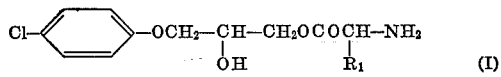

wherein $R_1$ is a hydrogen atom or a methyl group, inorganic acid addition salts thereof and a method of making same.

Description of the prior art

Chlorphenesin has been known as a skeletal muscle relaxant and as an antibiotic. Recently, it has been appreciated that chlorphenesin has anti-allergic activity.

SUMMARY OF THE INVENTION

A primary object of this invention is to provide chlorphenesin derivatives having a higher anti-allergic activity than chlorphenesin.

We have now discovered that the above chlorphenesin derivatives (I) or inorganic acid addition salts thereof such as hydrochloride addition salt have much higher anti-allergic activity than chlorphenesin.

These new chlorphenesin derivatives of the present invention can be obtained by condensing chlorphenesin of the following Formula II with a compound of the following General Formula III and then splitting off the amino-protective group from the resulting compound of the following Formula IV.

The above process according to this invention is expressed by the following equation:

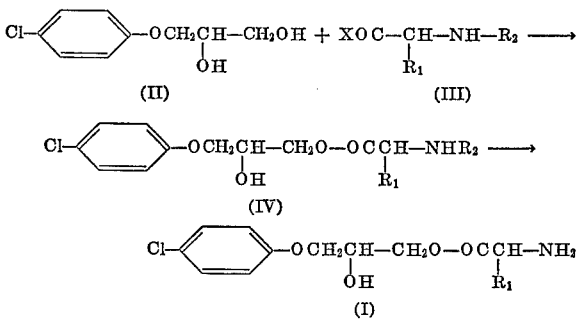

wherein X is a hydroxyl group or a halogen atom, $R_1$ is a hydrogen atom or a methyl group, and $R_2$ is an amino-protective group.

In the above process, any amino - protective group which can be split off without causing cleavage of the ester linkage between chlorphenesin of Formula II and the compound of Formula III may be used. For instance, benzyloxycarbonyl, tert.butoxycarbonyl, tert.amyloxycarbonyl groups, etc. may be used. The benzyloxycarbonyl group is especially suitable as the amino-protective group. In case X of the compound of Formula III is a hydroxyl group, chlorphenesin of Formula II is condensed with the compound of Formula III in the presence of a dehydrating agent of the carbodiimide type such, for example, as dicyclohexylcarbodiimide, thereby to form a compound of Formula IV. In case X is a halogen atom, the compound of Formula IV is obtained by conducting the condensation reaction in the presence of a basic catalyst such, for example, as pyridine.

The amino-protective group can be split off from the resulting compound of Formula IV by any conventional method. For instance, the benzyloxycarbonyl group may be split off by catalytic reduction under acidic conditions or by treatment with hydrogen bromide and acetic acid at room temperature. In the case of the tert.butoxycarbonyl group and tert.amyloxycarbonyl group, the splitting may be accomplished by treatment with a dilute mineral acid solution at room temperature.

In case the condensation reaction between chlorphenesin of Formula II and a compound of Formula III (in which X is a hydroxyl group) is effected in the presence of a dehydrating agent of the carbodiimide type, the reaction temperature is maintained at such a low level as ranging from −5° C. to −10° C. In case the condensation of chlorphenesin of Formula II with a compound of Formula III (in which X is a halogen atom) is conducted in the presence of a basic catalyst, the condensation is effected at a temperature ranging from room temperature to the reflux temperature of the solvent used. In the former case, tetrahydrofuran is suitable as the reaction solvent, and in the latter case, benzene is a preferable solvent. After the condensation reaction is completed, the product (IV) can be isolated through conventional isolation procedures such as filtration or removal of solvent. If necessary, the recrystallization of the product is carried out. A mixed solvent of isopropyl ether and chloroform is suitable for recrystallization of the compound of Formula IV. Then the amino-protective group of the compound of Formula IV is split off in such manner as mentioned above. After the reaction is completed, the Compound I is isolated in a stable form of its inorganic acid addition salt such as hydrochloride salt through conventional isolation procedures such as filtration or removal of solvent. If necessary, the recrystallization of the product is carried out. As a solvent for recrystallization of an inorganic acid addition salt of the compound of Formula I, a mixed solvent of methanol and isopropyl ether is suitable.

Inorganic acid addition salts of chlorphenesin derivatives of Formula I obtained by the above process of this invention, such, for example, as chlorphenesin glycinate hydrochloride and chlorphenesin alaninate hydrochloride, exhibit such a high solubility in water that 1 g. of the salt is readily dissolved in 1 ml. of water to form a transparent solution. Accordingly, with use of inorganic acid addition salts of chlorphenesin derivatives of this invention, it is possible to prepare injection formulations for subcutaneous, intramuscular or intravenous injection and also aqueous solutions which contain the active ingredient at a high concentration. Compositions containing the chlorphenesin derivative according to the present invention can take the form of aqueous solutions, tablets, or other type of medicaments.

DESCRIPTION OF THE PREFERRED EMBODIMENTS

This invention will now be illustrated by reference to examples, but the scope of this invention is not limited by these examples.

EXAMPLE 1

Preparation of chlorphenesin carbobenzoxyglycinate 80 g. of chlorphenesin and 83 g. of carbobenzoxyglycine were dissolved in 800 ml. of anhydrous tetrahydrofuran, and the solution was cooled to $-10°$ C., followed by addition of 100 g. of dicyclohexylcarbodiimide. Then, the reaction was carried out at $-5°$ C. to $-10°$ C. under stirring for 7 hours. After the reaction, the reaction mixture was subjected to suction filtration to remove dicyclohexylurea formed as a by-product by the reaction. The filtrate was concentrated and the residual solid was recrystallized several times from a mixed solvent of chloroform and isopropyl ether to obtain 22 g. of chlorphenesin carbobenzoxyglycinate melting at $85.9°$ C. Results of the elementary analysis of the product are as follows:

Calculated (percent): C, 57.95; H, 5.12; N, 3.56.
Found (percent): C, 58.23; H, 5.18; N, 3,66.

Preparation of chlorphenesin glycinate hydrochloride 20 g. of chlorphenesin carbobenzoxyglycinate was dissolved in 200 ml. of methanol containing 2 g. of hydrogen chloride, and 1.5 g. of 10% palladium-on-carbon as catalyst was added thereto. The reaction was carried out by blowing hydrogen gas into the solution for 2 hours. After the reaction, the reaction mixture was filtered to remove the catalyst and the filtrate was concentrated. The residue was washed with acetone and the solvent was removed by filtration to obtain 13 g. of crude crystals. The crude crystals were recrystallized from a mixed solvent of methanol and isopropyl ether to obtain 6.5 g. of columnar crystals of chlorphenesin glycinate hydrochloride melting at $162.2°$ C. Results of the elementary analysis of the product are as follows:

Calculated (percent): C, 44.61; H, 5.11; N, 4.73.
Found (percent): C, 44.68; H, 5.15; N, 4.86.

EXAMPLE 2

Preparation of chlorphenesin carbobenzoxy-L-alaninate

Procedures of Example 1 were repeated under the same conditions as in Example 1 except that 88 g. of carbobenzoxy-L-alaninate was used instead of 83 g. of carbobenzoxyglycine. Thus was obtained 36 g. of chlorphenesin carbobenzoxy-L-alaninate melting at $87.4°$ C. Results of the elementary analysis of the product are as follows:

Calculated (percent): C, 58.90; H, 5.44; N, 3.43.
Found (percent): C, 58.70; H, 5.32; N, 3.50.

Preparation of chlorphenesin-L-alaninate hydrochloride 30 g. of chlorphenesin carbobenzoxy-L-alaninate was dissolved in 300 ml. of methanol containing 3 g. of hydrogen chloride and 2 g. of 10% palladium-on-carbon was added to the solution. The subsequent procedures were similar to those adopted in Example 1. Thus was obtained 3.5 g. of chlorphenesin-L-alaninate hydrochloride in the columnar crystal form, which was found to have a melting point of $136°$ C. Results of the elementary analysis of the product are as follows:

Calculated (percent): C, 46.47; H, 5.52; N, 4.52.
Found (percent): C, 46.60; H, 5.58; N, 4.72.

Results of pharmacological tests made on chlorphenesin derivatives according to the present invention will now be described.

Inhibition effects of chlorphenesin glycinate hydrochloride (which will be abbreviated as "CPG" hereinbelow) and chlorphenesin alaninate hydrochloride (which will be abbreviated as "CPA" hereinbelow) on rat mast cell degranulation medicated by IgE-anti IgE were studied by the following experiment.

Rat mast cells were isolated from rat abdominal cavity solution by means of Ficoll over layer method. Buffer solution of CPG or CPA ($2\times10^{-3}$ M) was added to the obtained suspension of mast cells in the same amount, and the mixed liquor was allowed to stand still at a room temperature for 10 minutes. Then, the liquor was centrifuged and the supernate was removed.

0.05 ml. of IgE and anti IgE was added to it and mast cells were dyed by neutral red on an object glass and immediately the degranulation ratio of mast cells was calculated by microscopic inspection. For the sake of comparison chlorphenesin (which will be abbreviated as "CP" hereinbelow) was also tested.

|         | Mast cell degranulation ratio (percent) |
|---------|------|
| Control | 91 |
| CP      | 43 |
| CPG     | 25 |
| CPA     | 7  |

From this experiment, it is apparent that CPG and CPA have superior anti-allergic activities to CP.

What we claim is:

1. A chlorphenesin derivative selected from the group consisting of compounds expressed by the general formula of

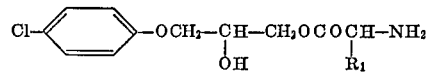

wherein $R_1$ is a hydrogen atom or a methyl group; and the inorganic acid addition salts thereof.

2. The compound as claimed in claim 1, consisting of chlorphenesin glycinate hydrochloride.

3. The compound as claimed in claim 1, consisting of chlorphenesin alaninate hydrochloride.

References Cited

UNITED STATES PATENTS 3,223,725  12/1965  Hill _____ 260—482 R

LORRAINE A. WEINBERGER, Primary Examiner

P. J. KILLOS, Assistant Examiner

U.S. Cl. X.R.

424—311